US011365992B2

(12) United States Patent
Allstrom et al.

(10) Patent No.: US 11,365,992 B2
(45) Date of Patent: Jun. 21, 2022

(54) SYSTEMS AND METHODS FOR VALIDATING A VORTEX FLUID FLOW SIGNAL

(71) Applicant: SCHNEIDER ELECTRIC SYSTEMS USA, INC., Foxboro, MA (US)

(72) Inventors: Peter E. Allstrom, Warwick, RI (US); Timothy Dorr, Medway, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 217 days.

(21) Appl. No.: 16/709,002

(22) Filed: Dec. 10, 2019

(65) Prior Publication Data
US 2021/0172773 A1 Jun. 10, 2021

(51) Int. Cl.
*G01F 1/32* (2022.01)
*G05D 7/06* (2006.01)

(52) U.S. Cl.
CPC .............. *G01F 1/32* (2013.01); *G05D 7/0635* (2013.01)

(58) Field of Classification Search
CPC ....... G01F 1/32; G05D 7/0635; H03J 2200/08
See application file for complete search history.

(56) References Cited

U.S. PATENT DOCUMENTS

| 3,968,353 | A | * | 7/1976 | Kuller | ............... | B63B 39/03 |
| | | | | | | 701/21 |
| 4,433,573 | A | * | 2/1984 | Hulin | ............... | E21B 47/10 |
| | | | | | | 73/152.32 |
| 5,576,497 | A | * | 11/1996 | Vignos | ............... | G01F 1/329 |
| | | | | | | 73/861.18 |
| 6,220,103 | B1 | * | 4/2001 | Miller | ............... | G01F 1/3263 |
| | | | | | | 73/861.22 |
| 6,276,218 | B1 | | 8/2001 | Waers | | |
| 2002/0129661 | A1 | * | 9/2002 | Clarke | ............... | G01F 1/329 |
| | | | | | | 73/861.22 |
| 2009/0024037 | A1 | * | 1/2009 | Baba | ............... | A61B 8/06 |
| | | | | | | 600/454 |
| 2015/0218010 | A1 | * | 8/2015 | Benavides | ............... | C02F 1/004 |
| | | | | | | 210/741 |
| 2018/0143055 | A1 | * | 5/2018 | Artiuch | ............... | G01M 3/00 |

* cited by examiner

*Primary Examiner* — Mark A Connolly
(74) *Attorney, Agent, or Firm* — Locke Lord LLP (57) ABSTRACT

Vortex sensor amplitude information may be used to validate that a vortex signal being measured corresponds to an actual fluid flow and is not noise. The estimated amplitude of a sinusoidal vortex signal is used as a secondary means to determine the fluid flow based on vortex sensor characteristics. The original amplitude of the sinusoidal vortex signal is determined from a clipped voltage amplitude sinusoidal signal. The estimated velocity of the fluid in a pipe based on the original amplitude of the sinusoidal vortex signal is compared to the measured velocity of the fluid based on vortex velocity frequency. If the two determined velocities do not reasonably agree, the measured vortex signal is not a valid flow signal and adaptive filters are adjusted to reduce the effects of noise.

19 Claims, 9 Drawing Sheets

SYSTEMS AND METHODS FOR VALIDATING A VORTEX FLUID FLOW SIGNAL

TECHNICAL FIELD

The present disclosure relates to validating a vortex fluid flow signal, and more particularly relates to using a determined true amplitude of clipped sinusoidal vortex signal from a flow meter to validate that the vortex signal being measured corresponds to an actual fluid flow and is not noise.

BACKGROUND

There are applications where the amplitude information of a signal would provide additional opportunities to determine signal integrity. In modern low-voltage designs, it may be necessary to keep input signal voltage levels below the limits of a system voltage to prevent damage to the system's electronics. By clipping the original signal voltages to the limits of the system voltage, true amplitude information in the original signal may be lost.

One example of clipping input signal voltages to the limits of the system voltage is for a vortex signal output by a vortex sensor in a flow meter. Vortex sensors are used to measure the velocity of a fluid flowing through a pipe, from which may be determined the volume or mass of fluid flowing per unit time through the pipe. The vortex signal is created by a bluff body positioned in the stream of the flowing fluid through the pipe. The fundamental characteristic waveform of a vortex signal is that of a sinusoid. The frequency of the vortex signal is referred to as the vortex velocity frequency or the vortex shedding frequency, which is proportional to the velocity of the fluid flowing through the pipe. The amplitude of the vortex signal is proportional to the velocity squared times the density of the fluid. The vortex signal output by a vortex sensor is typically input to sensor electronics of a flow meter. Practical sensor electronics in flow meters typically have limits to the input voltages they can handle, and thus the input vortex signal voltage needs to be clipped to be within the limits. To improve the signal-to-noise ratio of the clipped vortex signal, the flow meter may adjust an adaptive frequency filter that is set based on a measured vortex velocity frequency. However, it is possible for filter algorithms to move to a non-optimal setting in the presence of certain noise patterns, resulting in increased errors in measuring fluid flow through the pipe.

SUMMARY

In accordance with one embodiment described herein, the original, true amplitude of the sinusoidal vortex signal may be used to validate that the vortex signal being measured, corresponds to the actual fluid flow and is not noise. The original, true amplitude of the sinusoidal vortex signal is used as a secondary means to determine the fluid velocity, based on the density and vortex sensor's characteristics. The original, true amplitude of the sinusoidal vortex signal created by the vortex sensor may be large and may require the voltage amplitude of the sinusoidal signal to be clipped, resulting in a loss in the original amplitude information.

The described embodiment estimates the true amplitude of the sinusoidal vortex signal from the clipped sinusoidal signal. A first value of the velocity of the fluid in the pipe is determined based on the estimated original, true amplitude of the sinusoidal vortex signal. This first value of the velocity is then compared to a second value of the velocity of the fluid, which is determined based on the vortex velocity frequency.

If the two determined velocities do not reasonably agree, the measured vortex signal is not a valid flow signal and adaptive filters in the flow meter are adjusted.

In accordance with one embodiment described herein, a method, comprises:

filtering a sinusoidal vortex signal generated by a vortex sensor excited by a fluid flowing past the vortex sensor in a pipe, using a tracking band pass filter to minimize noise waveforms;

determining a measured velocity of the fluid flowing past the vortex sensor in the pipe, based on a measured vortex velocity frequency of the sinusoidal vortex signal generated by the vortex sensor, the fluid having a known density;

determining an estimated velocity of the fluid flowing past the vortex sensor in the pipe, based on an estimated amplitude of the sinusoidal vortex signal and the density of the fluid;

comparing the measured velocity with the estimated velocity to determine whether to change the tracking band pass filter to improve accuracy of determining the measured velocity;

changing the tracking band pass filter in response to the comparing operation and repeating the filtering operation using a changed tracking band pass filter, the determining operations, and the comparing operation; and determining an improved accuracy measured velocity of the fluid, using the changed tracking band pass filter, for output to a utilization device.

In accordance with one embodiment described herein, the method further comprises:

receiving the sinusoidal vortex signal as a clipped voltage amplitude sinusoidal signal that was originally generated by the vortex sensor as an original sinusoidal vortex signal having an originally unclipped voltage amplitude before having been clipped, the clipped voltage amplitude sinusoidal signal retaining the vortex velocity frequency produced by the vortex sensor, the received clipped voltage amplitude sinusoidal signal being received combined with the noise waveforms;

filtering the clipped voltage amplitude sinusoidal signal using the tracking band pass filter to minimize the noise waveforms;

determining the measured velocity of the fluid as a function of the retained vortex velocity frequency of the filtered, clipped voltage amplitude sinusoidal signal; and determining the estimated amplitude of the sinusoidal vortex signal from the filtered, clipped voltage amplitude sinusoidal signal.

In accordance with one embodiment described herein, the method further comprises:

measuring a period of the received clipped voltage amplitude sinusoidal signal;

setting a first trip point voltage and a second trip point voltage with a voltage difference value between the first trip point voltage and the second trip point voltage;

determining a time difference measured between when the received clipped voltage amplitude sinusoidal signal passes through the first trip point voltage and passes through the second trip point voltage;

determining an angle value as a product of pi times a ratio of the time difference to the measured period; and determining the estimated amplitude of the sinusoidal vortex signal from a ratio of the voltage difference value and a value of two times the sine of the angle value.

In accordance with one embodiment described herein, the method further comprises:

controlling an actuator of a valve as the utilization device, configured to control a flow rate of a fluid flowing through the valve and through the vortex sensor, in response to a determined value of the fluid velocity.

In accordance with one embodiment described herein, the method further comprises:

controlling a totalizer configured to count units of a fluid flowing through the vortex sensor, in response to the determined value of the fluid velocity.

In accordance with one embodiment described herein, an apparatus, comprises:

at least one processor;

at least one memory including computer program code, wherein the computer program code, when executed by operation of the at least one processor, performs an operation comprising:

filtering a sinusoidal vortex signal generated by a vortex sensor excited by a fluid flowing past the vortex sensor in a pipe, using a tracking band pass filter to minimize;

determining a measured velocity of the fluid flowing past the vortex sensor in the pipe, based on a measured vortex velocity frequency of the sinusoidal vortex signal generated by the vortex sensor, the fluid having a known density;

determining an estimated velocity of the fluid flowing past the vortex sensor in the pipe, based on an estimated amplitude of the sinusoidal vortex signal and the density of the fluid;

comparing the measured velocity with the estimated velocity to determine whether to change the tracking band pass filter to improve accuracy of determining the measured velocity;

changing the tracking band pass filter in response to the comparing operation and repeating the filtering operation using a changed tracking band pass filter, the determining operations, and the comparing operation; and determining an improved accuracy measured velocity of the fluid, using the changed tracking band pass filter, for output to a utilization device.

In accordance with one embodiment described herein, the apparatus further comprises:

at least one memory including computer program code, wherein the computer program code, when executed by operation of the at least one processor, performs an operation comprising:

controlling an actuator of a valve as the utilization device, configured to control a flow rate of a fluid flowing through the valve and through the vortex sensor, in response to a determined value of the fluid velocity.

In accordance with one embodiment described herein, the apparatus further comprises:

at least one memory including computer program code, wherein the computer program code, when executed by operation of the at least one processor, performs an operation comprising:

controlling a totalizer configured to count units of a fluid flowing through the vortex sensor, in response to the determined value of the fluid velocity.

The resulting method, apparatus, system, and computer program product uses the original amplitude of the sinusoidal vortex signal to validate that the vortex signal being measured corresponds to the actual fluid flow and is not noise.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

Figures 1, 3A, 4:
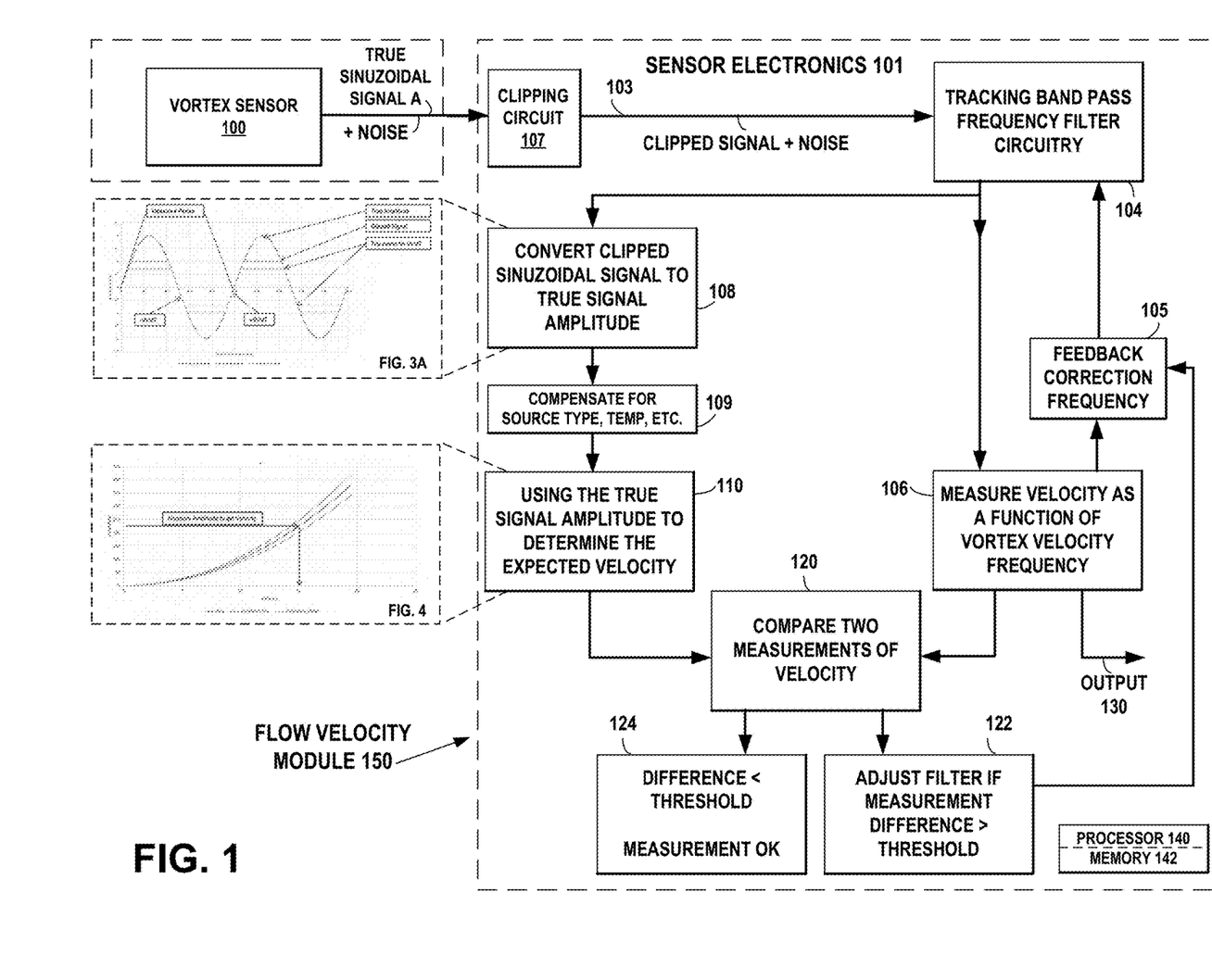
FIG. 1 is an example functional block diagram of a flow velocity module using both true vortex signal amplitude and vortex velocity frequency to measure the velocity of a fluid with a vortex sensor, according to an embodiment of the disclosure.
FIG. 3A is an example graph of vortex signal amplitude versus time, illustrating how the flow velocity module of FIG. 1 determines true sinusoidal vortex signal amplitude from a clipped sinusoidal voltage signal, according to an embodiment of the disclosure.
FIG. 4 is an example graph of valid values expected for true vortex signal amplitude from the vortex sensor versus corresponding valid fluid velocity values expected as a function of vortex velocity frequency from the vortex sensor, according to an embodiment of the disclosure.

FIG. 1 is an example functional block diagram of a flow velocity module 150 using both true vortex signal amplitude A and vortex velocity frequency f to measure the velocity of a fluid with a vortex sensor 100. The flow velocity module 150 derives an original, true amplitude A of the sinusoidal vortex signal produced by the vortex sensor 100, from a clipped voltage amplitude sinusoidal signal 103 whose voltage range has been limited by a clipping circuit 107 to a system voltage. The flow velocity module 150 uses the original, true amplitude A of the sinusoidal vortex signal to validate that the vortex signal being measured corresponds to the actual fluid flow through the sensor 100 and is not noise. The original, true amplitude A of the sinusoidal vortex signal is used as a secondary means to determine the fluid velocity, based on the vortex sensor's 100 characteristics.

Figure 2A:
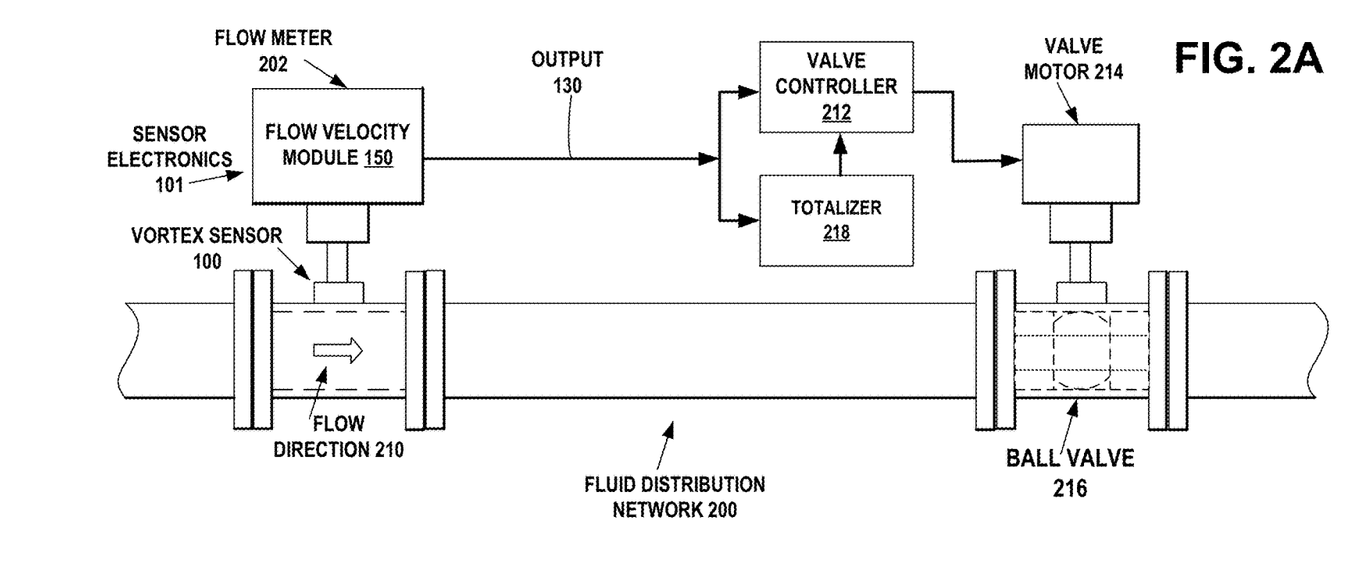
FIG. 2A illustrates an example fluid distribution network in which the flow velocity module of FIG. 1, which is part of the sensor electronics of a flow meter, measures the velocity of the fluid with the vortex sensor in the flow meter and outputs a flow rate signal to control a valve, according to an embodiment of the disclosure.
Figure 2B:
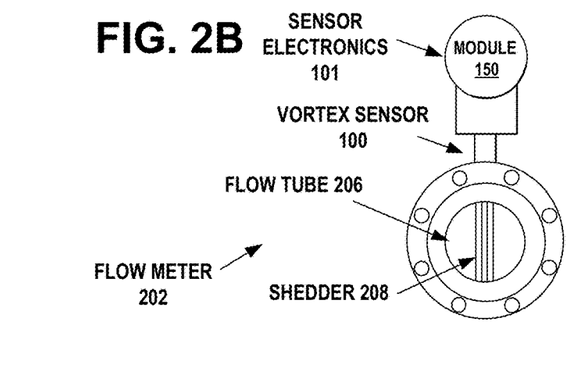
FIG. 2B is a view along the fluid flow direction, of the flow meter of FIG. 2A.
Figure 2C:
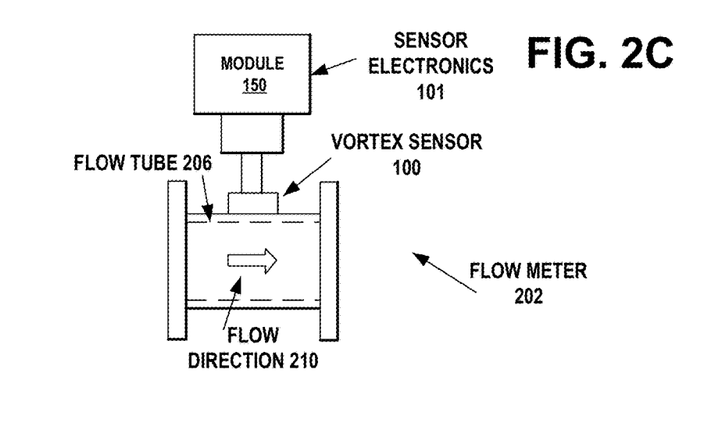
FIG. 2C is a side view of the flow meter shown in FIG. 2B.

FIGS. 2A, 2B, and 2C show an example of a vortex sensor 100 in a flow meter 202, used in a fluid distribution network 200 to measure the velocity of the fluid flowing in the direction 210 in the network 200. The flow velocity module 150 of FIG. 1, which is part of sensor electronics 101 in the flow meter 202, measures the actual velocity of the fluid flowing through the vortex sensor 100 and outputs a flow rate signal 130 to control a motor 212 for a ball valve 216 and a totalizer 218. In an alternate embodiment, the flow velocity module 150 may also include the totalizer function, configured to count units of the fluid flowing through the vortex sensor 100.

The operation of the vortex sensor 100 is based on vortex shedding of the Karman effect, wherein a bluff body or shedder 208 is placed in a flow tube 206 in the stream 210 of fluid flowing through the flow tube 206. The shedder 208 causes vortices to form in the passing stream. These vortices cause fluctuating pressure variations that are sensed by the vortex sensor 100. The frequency of the vortices' pressure variations occurring during vortex generation are directly proportional to the flow rate of the fluid passing the shedder 208.

The original, true vortex sensor signal produced by the vortex sensor 100 is a sinusoid function y(t) shown in FIG. 3A, of amplitude A and frequency f, with an additive noise component n(t):

$$y(t) = A \sin 2\pi f t + n(t),$$

where f is the frequency to be determined. The amplitude A is proportional to $f^2$, which is the amplitude of the electrical signal corresponding to fluctuations in the density of the fluid as it flows through the vortex sensor 100. The symbol n(t) represents noise waveforms, which may be a combination of statistical noise and externally originated fluid vibrations, such as from the operation of valves.

It may be necessary in the system electronics to keep input signal voltage levels below the limits of a system voltage to prevent damage to the system's electronics. Thus clipping may be necessary of the original, true vortex sensor signal produced by the vortex sensor 100, to the limits of the system voltage with the clipping circuit 107. This results in the clipped voltage amplitude sinusoidal signal 103 whose voltage range has been limited to a system voltage.

According to an embodiment, the example flow velocity module 150 of FIG. 1 derives the original, true amplitude A of the sinusoidal vortex signal produced by the vortex sensor 100, from the clipped voltage amplitude sinusoidal signal 103. The example flow velocity module 150 uses both the original, true vortex amplitude A of the sinusoidal vortex signal and the vortex velocity frequency f to measure the velocity of the fluid through the vortex sensor 100. The flow velocity module 150 uses the original, true amplitude A of the sinusoidal vortex signal to validate that the vortex signal being measured corresponds to the actual fluid flow through the sensor 100 and is not noise.

The clipped voltage amplitude sinusoidal signal 103 is received by the tracking band pass frequency filter circuitry 104 in the flow velocity module 150. The clipped voltage amplitude sinusoidal signal 103 retains the vortex velocity frequency f produced by the vortex sensor 100 measuring the fluid flow velocity in the flow tube 206. The received clipped voltage amplitude sinusoidal signal 103 is received combined with the noise waveforms n(t). The bandpass frequency of the filter 104 is adjusted to approximate the value of the vortex velocity frequency f. The frequency bandwidth of the filter 104 is adjusted to attenuate or block the noise waveforms n(t). The resulting filtered waveform is output by the filter 104 in two paths. The first path from the output of filter 104 is to the module 108 to convert the clipped voltage amplitude sinusoidal signal 103 into the original, true amplitude A of the sinusoidal vortex signal produced by the vortex sensor 100. The second path from the output of filter 104 is to the module 106 to measure the fluid velocity as a function of the vortex velocity frequency f.

Figure 3A:
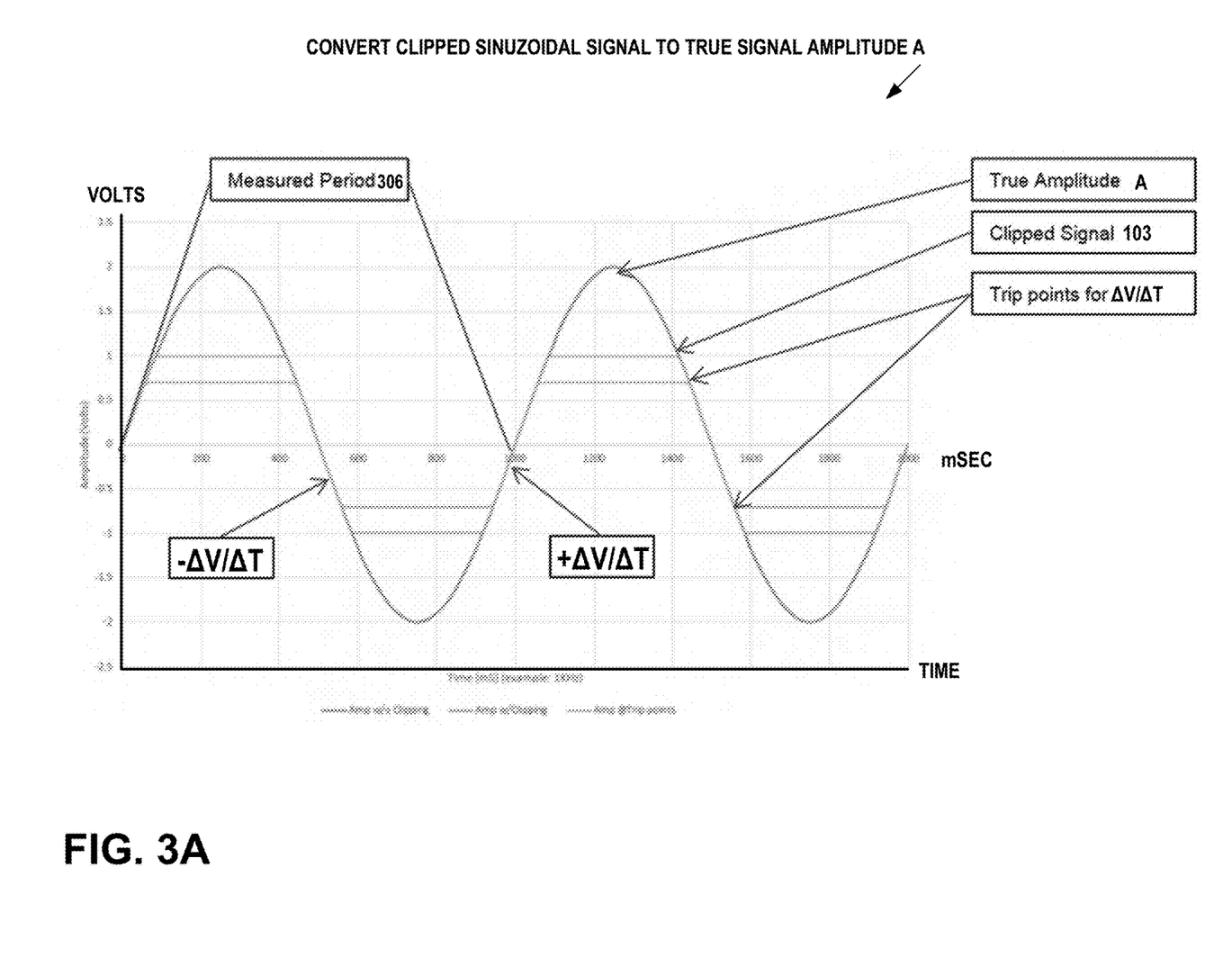
Figure 3B:
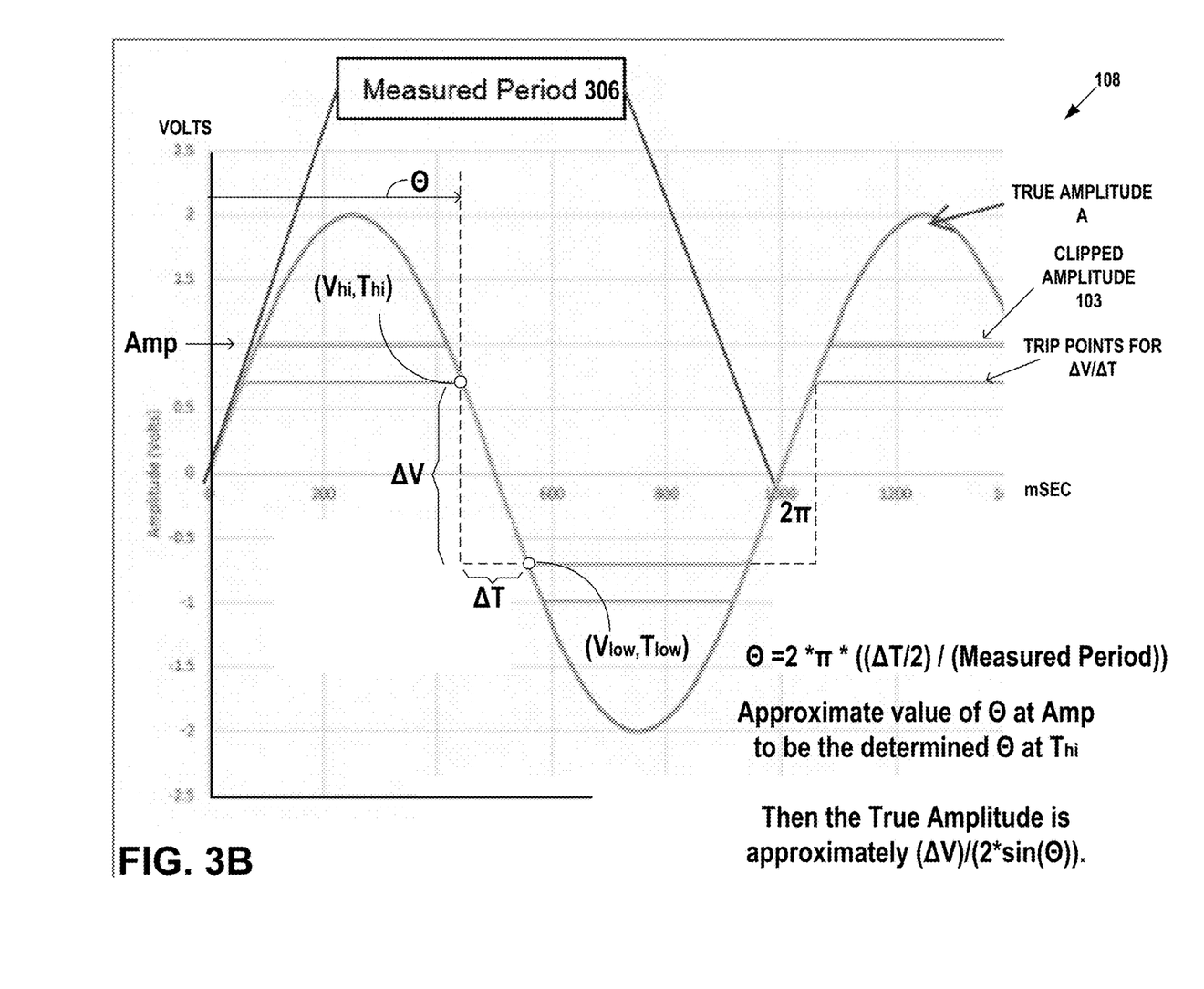
FIG. 3B is a more detailed view of the example graph of vortex signal amplitude versus time of FIG. 3A, illustrating the determination of true sinusoidal vortex signal amplitude from the clipped sinusoidal voltage signal, according to an embodiment of the disclosure.
Figure 4:
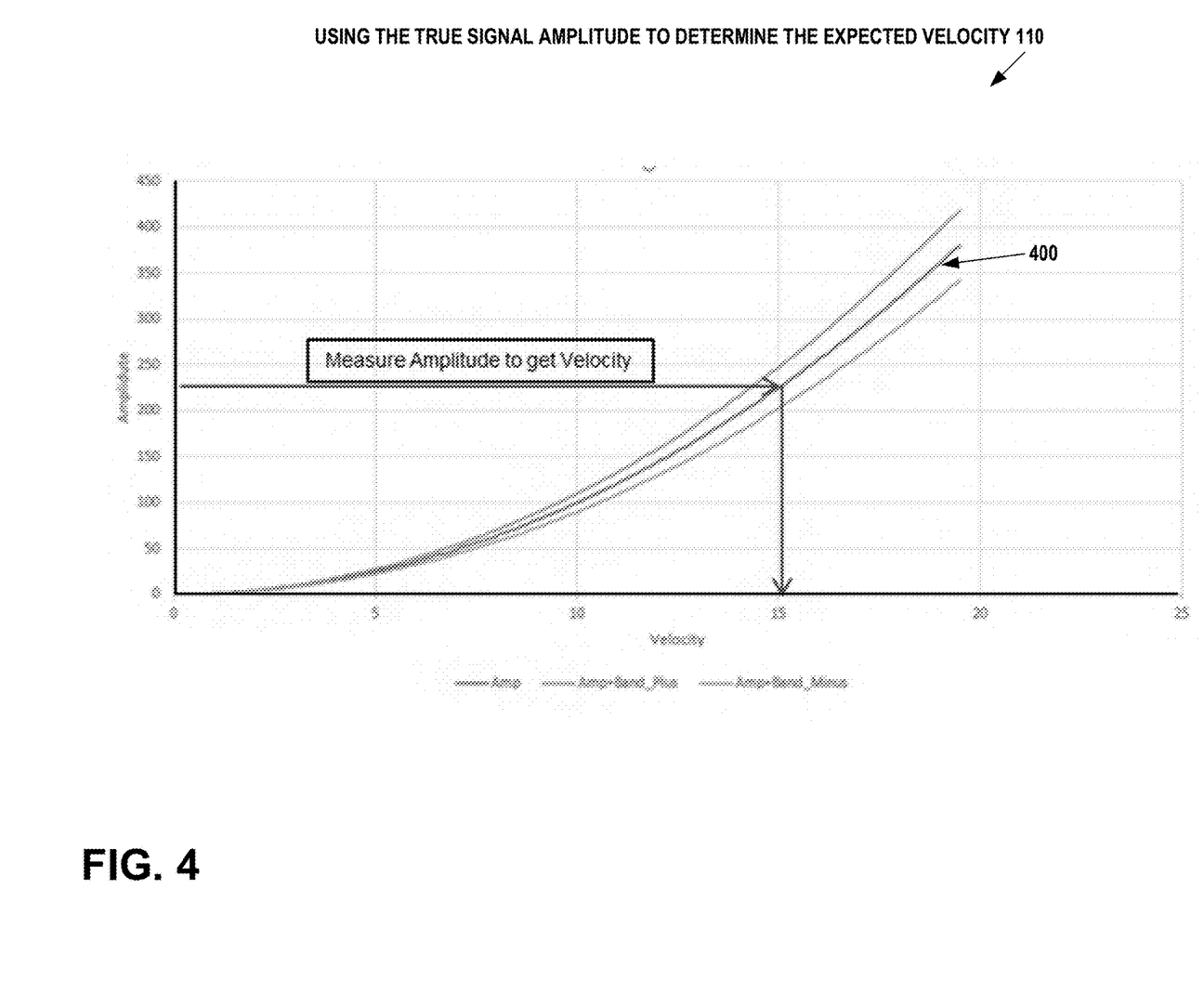

FIGS. 3A and 3B are example graphs of the vortex signal amplitude A versus time, illustrating how the module 108 of the flow velocity module 150 of FIG. 1 converts the received clipped voltage amplitude sinusoidal signal 103 into an estimated original, true amplitude A of the sinusoidal vortex signal produced by the vortex sensor 100. The period 306 is measured for the received clipped voltage amplitude sinusoidal signal 103. A first trip point voltage Vhi at the time Thi and a second trip point voltage Vlow at the time Tlow are set with a voltage difference value ΔV between the first trip point voltage and the second trip point voltage. In the example shown, the first trip point voltage Vhi and a second trip point voltage Vlow are equidistant from the zero voltage abscissa of the graph. A time difference ΔT is measured, for example by a timer, such as a Field Programmable Gate Array (FPGA) or an input capture function on a microcontroller, between when the received clipped voltage amplitude sinusoidal signal 103 passes through the first trip point voltage Vhi at the time Thi and passes through the second trip point voltage Vlow at the time Tlow. An angle value Θ (measured in radians) from the ordinate of the graph to the time Thi, is determined as a product of 2 times π times a ratio of the one half of the time difference ΔT to the measured period 306. The relationship may be restated as a product of π times a ratio of the time difference ΔT to the measured period 306. Then, the estimated value of the original, true amplitude A of the sinusoidal vortex signal is determined from a ratio of the voltage difference value ΔV and a value of two times the sine of the angle value Θ. The computer processor 140 and memory 142 are included in the flow velocity module 150 to convert the received clipped voltage amplitude sinusoidal signal 103 into the estimated original, true amplitude A of the sinusoidal vortex signal produced by the vortex sensor 100.

The estimated value of the original, true amplitude A of the sinusoidal vortex signal output from module 108 of FIG. 1, is applied to module 109 to compensate for variations in temperature, pressure, and viscosity of the fluid and vortex sensor characteristics. The thus compensated estimated value of the original, true amplitude A of the sinusoidal vortex signal is applied to the module 110 to determine the expected velocity of the fluid.

The error associated with determining the true amplitude A may depend on the accuracy and tolerances of the ΔV and ΔT measurements. As the ability to detect or measure the ΔV voltage gets smaller, the error in determining the true amplitude A may increase. When ΔV=0 then the true amplitude A determination may no longer be possible. As the ability to detect or measure the ΔT time gets smaller, the error in determining the true amplitude A may increase. When ΔT=0 then true the amplitude A determination may no longer be possible.

FIG. 4 is an example graph of valid values expected for the amplitude A of the original the sinusoidal vortex signal produced by the vortex sensor 100 versus corresponding valid fluid velocity values. Module 110 determines an estimated value V(A) of the of the velocity of the fluid as a function of the compensated estimated value of the original, true amplitude A of the sinusoidal vortex signal. The estimated the fluid velocity V(A) as a function of the estimated value of true amplitude A, is applied as one input to the comparator 120.

The second path from the output of filter 104 is to the module 106 to measure the fluid velocity as a function of the vortex velocity frequency f. The vortex velocity frequency is proportional to the velocity of the fluid flowing through the vortex sensor 100. The module 106 uses the adjusted band-pass frequency of the filter 104 to determine the measured value of the vortex velocity frequency f. The measured frequency is used to determine the fluid velocity V(f) as a function of the vortex velocity frequency f. The fluid velocity V(f) as a function of the vortex velocity frequency f is applied as a second input to the comparator 120.

The comparator 120 compares the measured fluid velocity V(f) as a function of the vortex velocity frequency f, with the estimated the fluid velocity V(A) as a function of the estimated value of true amplitude A. The result of the comparison determines whether to change the tracking frequency of the band pass filter 104 to improve accuracy of determining the fluid flow velocity using the vortex velocity frequency.

If the two velocities V(f) and V(A) compare reasonably well, then the tracking frequency of the band pass filter 104 is a good estimate of the actual vortex velocity frequency f and the determination of the fluid flow velocity using the vortex velocity frequency is accurate 124. The module 106 then provides a value of the fluid flow rate as an output signal 130 to utilization devices, such as the valve controller 212 and the totalizer 218 of FIG. 2A.

Alternately, if the two velocities V(f) and V(A) do not compare reasonably well, then the comparing operation outputs an enabling signal 122 to module 105 to send a feedback correction frequency to the filter 104 to adjust the tracking band pass filter. The filter 104 then repeats the filtering operation using a changed tracking band pass filter for a repeated processing in the flow velocity module, and the determining operations, and the comparing operation, as described.

Another embodiment for the comparator 120 determines whether the value V(f) of the fluid flow velocity based on the vortex velocity frequency located on an abscissa of the graph of FIG. 4 and the second value V(A) of the fluid flow velocity based on the original amplitude located on an ordinate of the graph of FIG. 4, intersect on a curve 400 on the graph. The curve 400 represents a product of a density of the fluid times fluid flow velocity squared as the ordinate versus fluid flow velocity as the abscissa for the fluid flowing in the vortex sensor. If the values of V(f) and V(A) intersect on the curve 400 or are within a given tolerance distance from the curve, then the comparison is satisfied.

The output signal 130 from the flow velocity module 150 may be used as a control signal to a valve controller 212 for an actuator or motor 214 of a valve 216 in FIG. 2A, configured to control a flow rate of a fluid flowing through the valve 216 and through the vortex sensor 100, in response to the determined value of the fluid flow velocity. The output signal 130 from the flow velocity module 150 may control a totalizer 218 configured to count units of the fluid flowing through the valve 216 and through the vortex sensor 100, in response to the determined value of the fluid flow velocity. The totalizer 218 may control the actuator or controller 212 of the valve 216 to turn off the valve when the count of the units by the totalizer 218 equals a predetermined quantity of units of the fluid flowing through the valve 216.

Figure 5A:
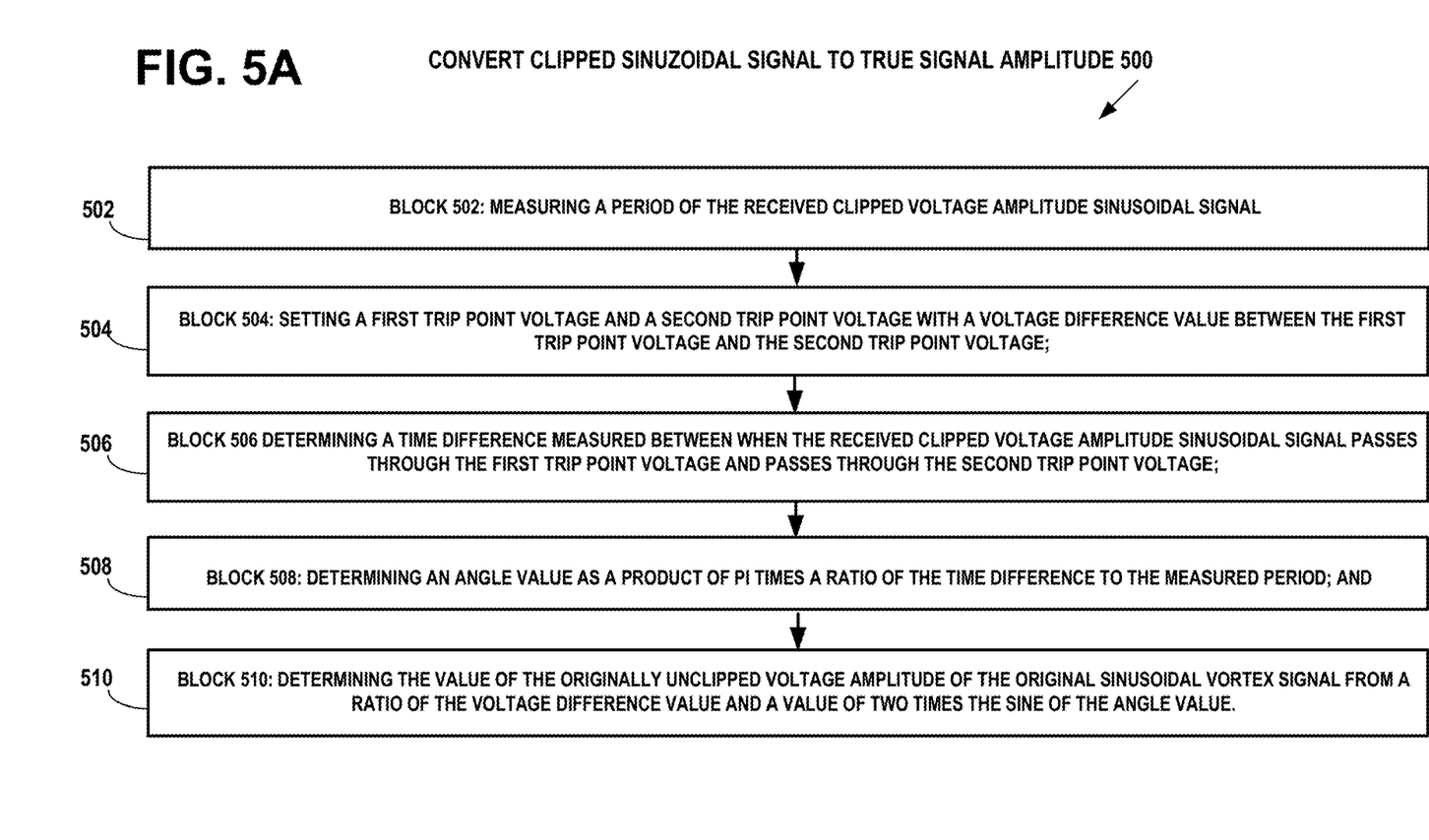
FIG. 5A is an example flow diagram of a process used by the flow velocity module of FIG. 1 to convert clipped sinusoidal vortex signal to true vortex signal amplitude, according to an embodiment of the disclosure

FIG. 5A is an example flow diagram 500 of a process used by module 108 of the flow velocity module 150 of FIG. 1, to convert the received clipped voltage amplitude sinusoidal signal 103 into an estimated original, true amplitude A of the sinusoidal vortex signal produced by the vortex sensor 100, according to an embodiment of the disclosure. The blocks of the flow diagram may represent computer code instructions stored in the memory 142, which when executed by the processor 140, carry out the functions of the example embodiments. The blocks may be carried out in another order than shown and individual blocks may be combined or separated into component blocks. The flow diagram has the following blocks:

Block 502: measuring a period of the received clipped voltage amplitude sinusoidal signal;

Block 504: setting a first trip point voltage and a second trip point voltage with a voltage difference value between the first trip point voltage and the second trip point voltage;

Block 506 determining a time difference measured between when the received clipped voltage amplitude sinusoidal signal passes through the first trip point voltage and passes through the second trip point voltage;

Block 508: determining an angle value as a product of pi times a ratio of the time difference to the measured period; and Block 510: determining the value of the originally unclipped voltage amplitude of the original sinusoidal vortex signal from a ratio of the voltage difference value and a value of two times the sine of the angle value.

Figure 5B:
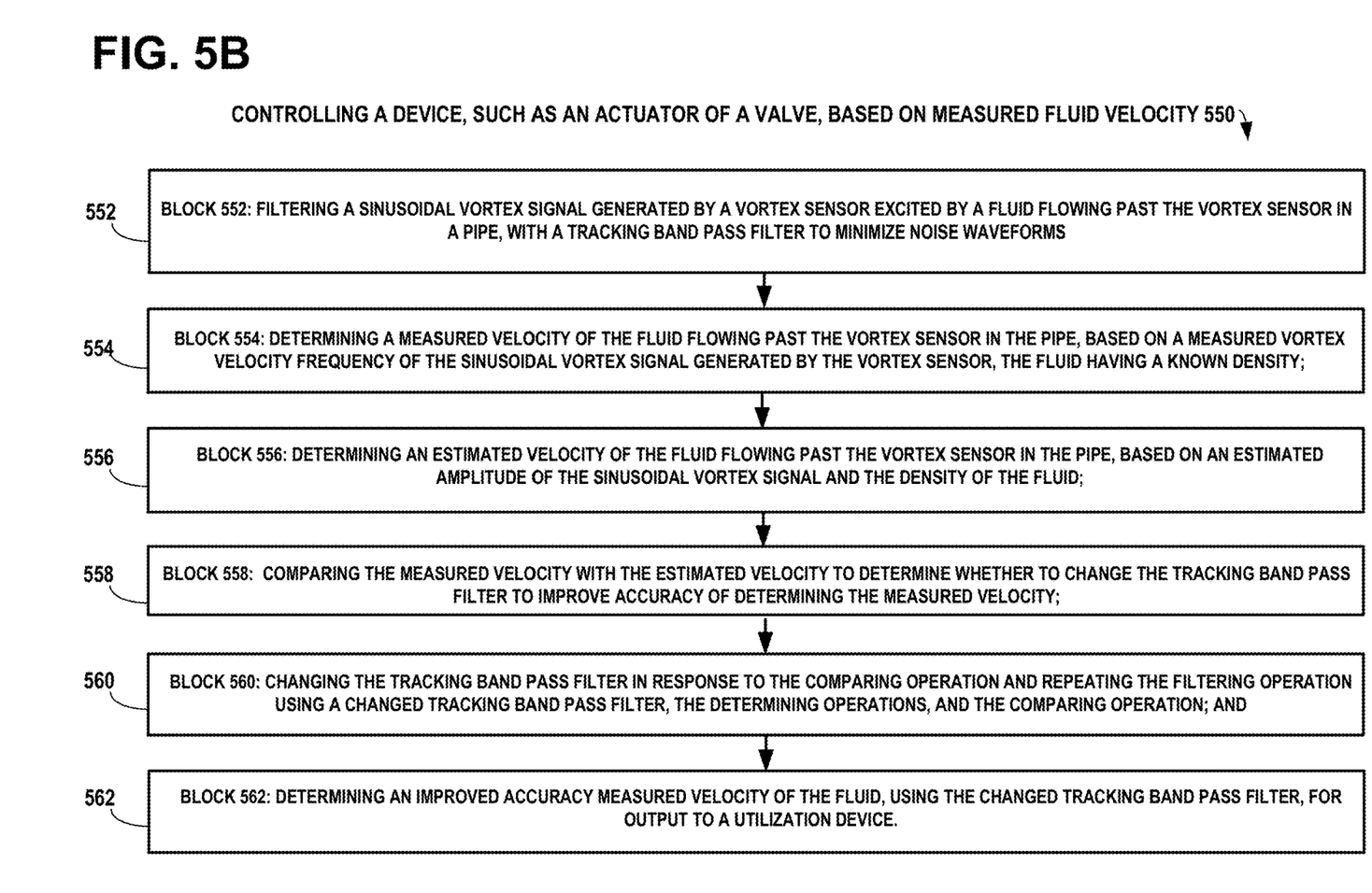
FIG. 5B is an example flow diagram of a process used by the flow velocity module of FIG. 1 to control a device, such as an actuator of a valve, based on measured fluid velocity determined by the flow velocity module, according to an embodiment of the disclosure.

FIG. 5B is an example flow diagram 550 of the process used by the flow velocity module 150 of FIG. 1 to control a device, such as an actuator or controller 212 of a valve 216, based on measured fluid velocity determined by the flow velocity module 150, according to an embodiment of the disclosure. The blocks of the flow diagram may represent computer code instructions stored in the memory 142, which when executed by the processor 140, carry out the functions of the example embodiments. The blocks may be carried out in another order than shown and individual blocks may be combined or separated into component blocks. The flow diagram has the following blocks:

Block 552: filtering a sinusoidal vortex signal generated by a vortex sensor excited by a fluid flowing past the vortex sensor in a pipe, using a tracking band pass filter to minimize noise waveforms;

Block 554: determining a measured velocity of the fluid flowing past the vortex sensor in the pipe, based on a measured vortex velocity frequency of the sinusoidal vortex signal generated by the vortex sensor, the fluid having a known density;

Block 556: determining an estimated velocity of the fluid flowing past the vortex sensor in the pipe, based on an estimated amplitude of the sinusoidal vortex signal and the density of the fluid;

Block 558: comparing the measured velocity with the estimated velocity to determine whether to change the tracking band pass filter to improve accuracy of determining the measured velocity;

Block 560: changing the tracking band pass filter in response to the comparing operation and repeating the filtering operation using a changed tracking band pass filter, the determining operations, and the comparing operation; and Block 562: determining an improved accuracy measured velocity of the fluid, using the changed tracking band pass filter, for output to a utilization device.

Figure 6A:
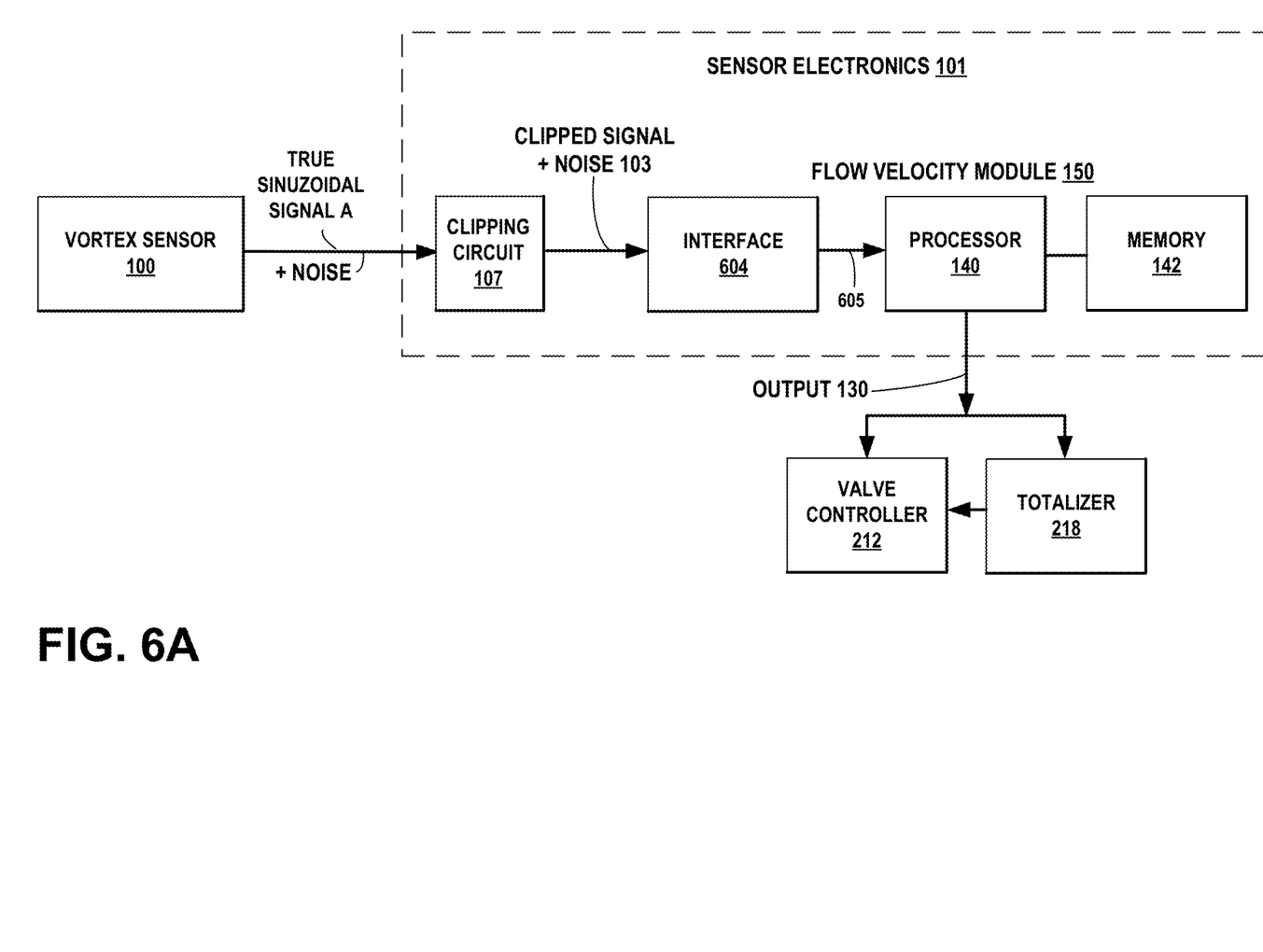
FIG. 6A is an example functional block diagram of the vortex sensor and flow velocity module of FIG. 1, and the valve controller of FIG. 2A, according to an embodiment of the disclosure.

FIG. 6A is an example functional block diagram of the vortex sensor 100 and flow velocity module 150 of FIG. 1, and the valve controller 212 of FIG. 2A, according to an embodiment of the disclosure. The flow velocity module 150, which is part of sensor electronics 101 in the flow meter 202, measures the actual velocity of the fluid flowing through the vortex sensor 100. The original, true vortex sensor signal A produced by the vortex sensor 100 is clipped by the clipping circuit 107 to the limits of the system voltage, resulting in the clipped voltage amplitude sinusoidal signal 103. The clipped voltage amplitude sinusoidal signal 103 is applied to the interface 604, which passes the signal on at 605 to the computer processor 140. The computer processor 140 and memory 142 in the flow velocity module 150 operate to convert the received clipped voltage amplitude sinusoidal signal 103 into the estimated original, true amplitude A of the sinusoidal vortex signal produced by the vortex sensor 100. After the determination and comparison steps described for the flow velocity module 150, it outputs the flow rate signal 130 to control a valve motor 212 and a totalizer 218. The output signal 130 may be used as a control signal to the valve controller 212 to control the flow rate of the fluid flowing through the valve 216 and through the vortex sensor 100, in response to the determined value of the fluid flow velocity. The output signal 130 may control the totalizer 218 to count units of the fluid flowing through the valve 216 and through the vortex sensor 100, in response to the determined value of the fluid flow velocity. The totalizer 218 may control the actuator or valve controller 212 of the valve 216 to turn off the valve when the count of the units by the totalizer 218 equals a predetermined quantity of units of the fluid flowing through the valve 216.

Figure 6B:
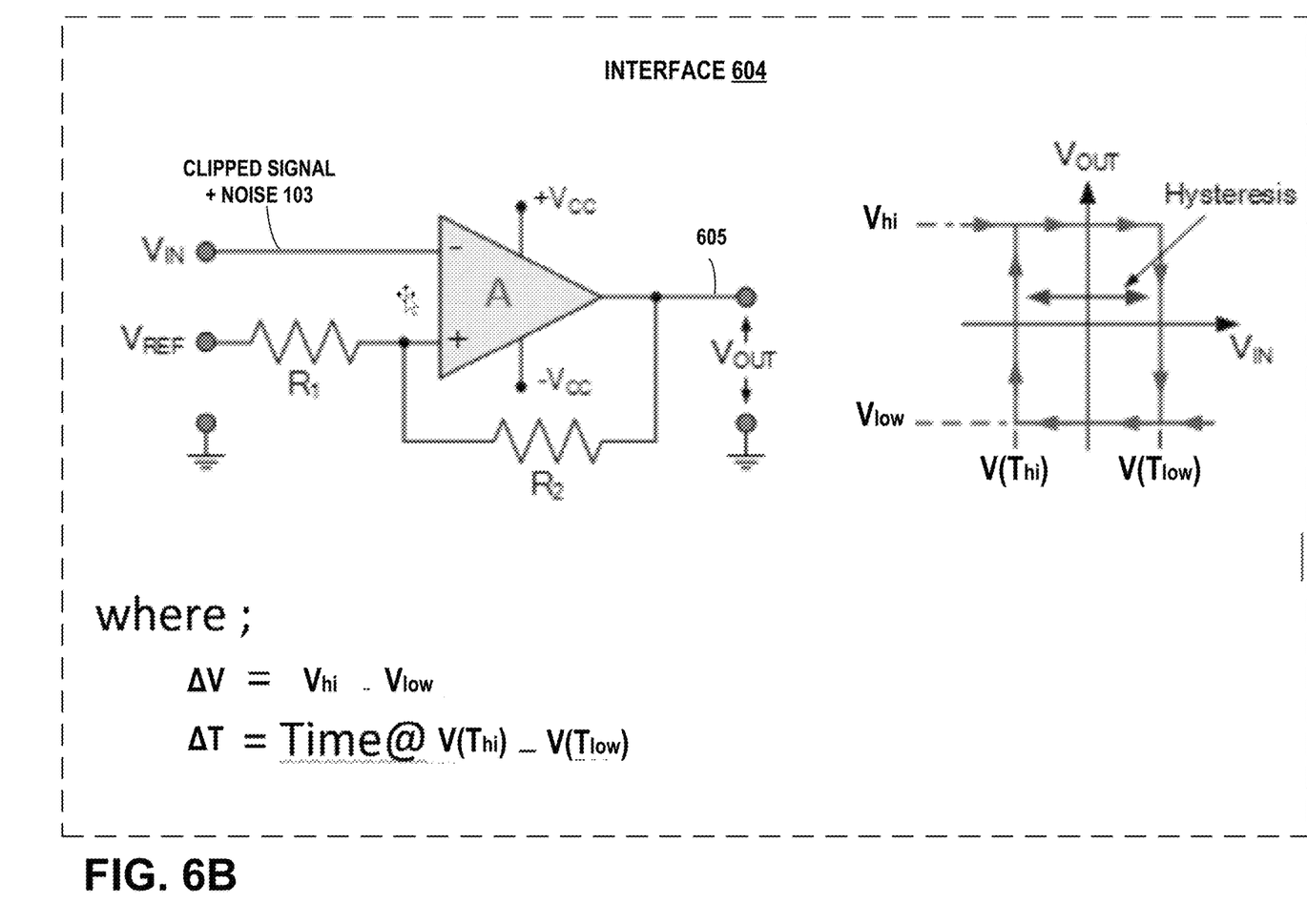
FIG. 6B is an example diagram of a vortex signal input interface of the flow velocity module of FIG. 6A, according to an embodiment of the disclosure.

FIG. 6B is an example schematic diagram of the vortex signal input interface 604 of the flow velocity module 150 of FIG. 6A, according to an alternate embodiment of the disclosure. The op-amp comparator compares the clipped signal 103 voltage level with a VREF voltage level, and produces an output signal based on this voltage comparison. The op-amp voltage comparator compares the magnitudes of the two voltage inputs and determines which is the larger of the two. The open-loop op-amp comparator behaves as a digital bistable device with hysteresis, since triggering causes it to have two possible output states, +Vcc or −Vcc. The op-amp comparator circuit may be used as a zero crossing detector of the clipped signal 103, which produces an output, HIGH or LOW every time the clipped signal 103 crossed the zero volts line from positive to negative or negative to positive. With reference to the example graph of FIG. 3B of the vortex signal amplitude versus time, the op-amp comparator of FIG. 6B may be used to identify the occurrence of the first trip point voltage Vhi at the time Thi and the second trip point voltage Vlow at the time Tlow, which have the voltage difference value ΔV between the first trip point voltage and the second trip point voltage.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim.

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "component", "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
    clipping a sinusoidal vortex signal to form a clipped voltage amplitude sinusoidal signal, which was generated by a vortex sensor excited by a fluid flowing past the vortex sensor in a pipe, the voltage amplitude of the clipped voltage amplitude sinusoidal signal being limited by a clipping circuit;
    filtering the clipped voltage amplitude sinusoidal signal using a tracking band pass filter to minimize noise waveforms;
    determining a measured velocity of the fluid flowing past the vortex sensor in the pipe, based on a measured vortex velocity frequency of the sinusoidal vortex signal generated by the vortex sensor, the fluid having a known density;
    determining an estimated velocity of the fluid flowing past the vortex sensor in the pipe, based on an estimated amplitude of the sinusoidal vortex signal determined from the voltage amplitude of the clipped voltage amplitude sinusoidal signal and the density of the fluid;
    comparing the measured velocity with the estimated velocity to determine whether to change the tracking band pass filter to improve accuracy of determining the measured velocity;
    changing the tracking band pass filter in response to the comparing operation and repeating the filtering operation using a changed tracking band pass filter, the determining operations, and the comparing operation; and
    determining an improved accuracy measured velocity of the fluid, using the changed tracking band pass filter, for output to a utilization device.

2. The method of claim 1, further comprising:
    receiving, by the tracking band pass filter, the sinusoidal vortex signal as the clipped voltage amplitude sinusoidal signal that was originally generated by the vortex sensor as an original sinusoidal vortex signal having an originally unclipped voltage amplitude before having been clipped, the clipped voltage amplitude sinusoidal signal retaining the vortex velocity frequency produced by the vortex sensor, the received clipped voltage amplitude sinusoidal signal being received combined with the noise waveforms;
    wherein the measured velocity of the fluid is determined as a function of the retained vortex velocity frequency of the filtered, clipped voltage amplitude sinusoidal signal; and
    wherein the estimated amplitude of the sinusoidal vortex signal is determined from the filtered, clipped voltage amplitude sinusoidal signal.

3. The method of claim 2, further comprising:
    measuring a period of the received clipped voltage amplitude sinusoidal signal;
    setting a first trip point voltage and a second trip point voltage with a voltage difference value between the first trip point voltage and the second trip point voltage;
    determining a time difference measured between when the received clipped voltage amplitude sinusoidal signal passes through the first trip point voltage and passes through the second trip point voltage;
    determining an angle value as a product of pi times a ratio of the time difference to the measured period; and
    determining the estimated amplitude of the sinusoidal vortex signal from a ratio of the voltage difference value and a value of two times the sine of the angle value.

4. The method of claim 3 wherein the comparing comprises:
    determining whether the measured velocity based on the vortex velocity frequency located on an abscissa of a graph and the estimated velocity of the fluid based on the estimated amplitude located on an ordinate of the graph, intersect on a curve on the graph of a product of a density of the fluid times fluid velocity squared as the ordinate versus fluid velocity as the abscissa for the fluid flowing in the vortex sensor.

5. The method of claim 1, further comprising:
    controlling an actuator of a valve as the utilization device, configured to control a flow rate of a fluid flowing through the valve and through the vortex sensor, in response to a determined value of the fluid velocity.

6. The method of claim 1, further comprising:
    controlling a totalizer configured to count units of a fluid flowing through the vortex sensor, in response to the determined value of the fluid velocity.

7. The method of claim 6, further comprising:
    controlling an actuator of a valve to turn off the valve when the count of the units by the totalizer equals a predetermined quantity of units of the fluid flowing through the vortex sensor.

8. The method of claim 1, wherein a determination of the estimated amplitude of the sinusoidal vortex signal includes compensating for variations in temperature, pressure, and viscosity of the fluid and vortex sensor characteristics.

9. An apparatus, comprising:
    at least one processor;
    at least one memory including computer program code, wherein the computer program code, when executed by operation of the at least one processor, performs an operation comprising:
    clipping a sinusoidal vortex signal to form a clipped voltage amplitude sinusoidal signal, Which was generated by a vortex sensor excited by a fluid flowing past the vortex sensor in a pipe, the voltage amplitude of the clipped voltage amplitude sinusoidal signal being limited by a clipping circuit;

receiving, by a tracking band pass filter, the sinusoidal vortex signal as the clipped voltage amplitude sinusoidal signal that was originally generated by the vortex sensor as an original sinusoidal vortex signal having an originally unclipped voltage amplitude before having been clipped, the received clipped voltage amplitude sinusoidal signal being received combined with noise waveforms;

filtering the clipped voltage amplitude sinusoidal signal using the tracking band pass filter to minimize the noise waveforms;

measuring a period of the received clipped voltage amplitude sinusoidal signal;

setting a first trip point voltage and a second trip point voltage with a voltage difference value between the first trip point voltage and the second trip point voltage;

determining a time difference measured between when the received clipped voltage amplitude sinusoidal signal passes through the first trip point voltage and passes through the second trip point voltage;

determining an angle value as a product of pi times a ratio of the time difference to the measured period; and determining an estimated amplitude of the sinusoidal vortex signal from a ratio of the voltage difference value and a value of two times the sine of the angle value;

determining a measured velocity of the fluid flowing past the vortex sensor in the pipe, based on a measured vortex velocity frequency of the sinusoidal vortex signal generated by the vortex sensor, the fluid having a known density;

determining an estimated velocity of the fluid flowing past the vortex sensor in the pipe, based on the estimated amplitude of the sinusoidal vortex signal determined from the clipped voltage amplitude sinusoidal signal and the density of the fluid;

comparing the measured velocity with the estimated velocity to determine whether to change the tracking band pass filter to improve accuracy of determining the measured velocity;

changing the tracking band pass filter in response to the comparing operation and repeating the filtering operation using a changed tracking band pass filter, the determining operations, and the comparing operation; and determining an improved accuracy measured velocity of the fluid, using the changed tracking band pass filter, for output to a utilization device.

10. The apparatus of claim 9, further comprising:

wherein the clipped voltage amplitude sinusoidal signal retains the vortex velocity frequency produced by the vortex sensor, the received clipped voltage amplitude sinusoidal signal being received combined with the noise waveforms;

wherein the measured velocity of the fluid is determined as a function of the retained vortex velocity frequency of the filtered, clipped voltage amplitude sinusoidal signal; and wherein the estimated amplitude of the sinusoidal vortex signal is determined from the filtered, clipped voltage amplitude sinusoidal signal.

11. The apparatus of claim 9, wherein the comparing comprises:

the at least one memory including computer program code, wherein the computer program code, when executed by operation of the at least one processor, performs an operation further comprising:

determining whether the measured velocity based on the vortex velocity frequency located on an abscissa of a graph and the estimated velocity of the fluid based on the estimated amplitude located on an ordinate of the graph, intersect on a curve on the graph of a product of a density of the fluid times fluid velocity squared as the ordinate versus fluid velocity as the abscissa for the fluid flowing in the vortex sensor.

12. The apparatus of claim 9, further comprising:

the at least one memory including computer program code, wherein the computer program code, when executed by operation of the at least one processor, performs an operation further comprising:

controlling an actuator of a valve as the utilization device, configured to control a flow rate of a fluid flowing through the valve and through the vortex sensor, in response to a determined value of the fluid velocity.

13. The apparatus of claim 9, further comprising:

controlling a totalizer configured to count units of a fluid flowing through the vortex sensor, in response to the determined value of the fluid velocity.

14. The apparatus of claim 13, further comprising:

controlling an actuator of a valve to turn off the valve when the count of the units by the totalizer equals a predetermined quantity of units of the fluid flowing through the vortex sensor.

15. The apparatus of claim 9, wherein a determination of the estimated amplitude of the sinusoidal vortex signal includes compensating for variations in temperature, pressure, and viscosity of the fluid and vortex sensor characteristics.

16. A computer program product comprising computer executable program code recorded on a computer readable non-transitory storage medium, the computer executable program code comprising:

code for clipping a sinusoidal vortex signal to form a clipped voltage amplitude sinusoidal signal, which was generated by a vortex sensor excited by a fluid flowing past the vortex sensor in a pipe, the voltage amplitude of the clipped voltage amplitude sinusoidal signal being limited by a clipping circuit;

code for filtering the clipped voltage amplitude sinusoidal signal using a tracking band pass filter to minimize noise waveforms;

code for determining a measured velocity of the fluid flowing past the vortex sensor in the pipe, based on a measured vortex velocity frequency of the sinusoidal vortex signal generated by the vortex sensor, the fluid having a known density;

code for determining an estimated velocity of the fluid flowing past the vortex sensor in the pipe, based on an estimated amplitude of the sinusoidal vortex signal determined from the clipped voltage amplitude sinusoidal signal and the density of the fluid;

code for comparing the measured velocity with the estimated velocity to determine whether to change the tracking band pass filter to improve accuracy of determining the measured velocity;

code for changing the tracking band pass filter in response to the comparing operation and repeating the filtering operation using a changed tracking band pass filter, the determining operations, and the comparing operation; and code for determining an improved accuracy measured velocity of the fluid, using the changed tracking band pass filter, for output to a utilization device.

17. The computer program product of claim 16, further comprising:
    code for receiving, by the tracking band pass filter, the sinusoidal vortex signal as the clipped voltage amplitude sinusoidal signal that was originally generated by the vortex sensor as an original sinusoidal vortex signal having an originally unclipped voltage amplitude before having been clipped, the clipped voltage amplitude sinusoidal signal retaining the vortex velocity frequency produced by the vortex sensor, the received clipped voltage amplitude sinusoidal signal being received combined with the noise waveforms;
    wherein the measured velocity of the fluid is determined as a function of the retained vortex velocity frequency of the filtered, clipped voltage amplitude sinusoidal signal; and
    wherein the estimated amplitude of the sinusoidal vortex signal is determined from the filtered, clipped voltage amplitude sinusoidal signal.

18. The computer program product of claim 17, further comprising:
    code for measuring a period of the received clipped voltage amplitude sinusoidal signal;
    code for setting a first trip point voltage and a second trip point voltage with a voltage difference value between the first trip point voltage and the second trip point voltage;
    code for determining a time difference measured between when the received clipped voltage amplitude sinusoidal signal passes through the first trip point voltage and passes through the second trip point voltage;
    code for determining an angle value as a product of pi times a ratio of the time difference to the measured period; and
    code for determining the estimated amplitude of the sinusoidal vortex signal from a ratio of the voltage difference value and a value of two times the sine of the angle value.

19. The computer program product of claim 16, further comprising:
    code for controlling an actuator of a valve as the utilization device, configured to control a flow rate of a fluid flowing through the valve and through the vortex sensor, in response to a determined value of the fluid velocity.

* * * * *